US007968207B2

(12) United States Patent
Douin et al.

(10) Patent No.: US 7,968,207 B2
(45) Date of Patent: Jun. 28, 2011

(54) METHOD OF PRODUCING AND JOINING SUPERALLOY BALLS BY MEANS OF BRAZING AND OBJECTS PRODUCED WITH SUCH JOINTS

(75) Inventors: Myriam Douin, St. Ciers de Canesse (FR); Marie-Pierre Bacos, Antony (FR); Alexandra Boyer, Fontenay aux Roses (FR); Aurélie Gregoire, Paris (FR); Pierre Josso, Issy les Moulineaux (FR); Sébastien Mercier, Clamart (FR); Ariel Moriel, Athis Mons (FR); Jason Nadler, Paris (FR); Serge Naveos, Chatenay Malabry (FR); Catherine Rio, Limours (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 648 days.

(21) Appl. No.: 11/988,345

(22) PCT Filed: Jul. 7, 2006

(86) PCT No.: PCT/FR2006/001643
§ 371 (c)(1),
(2), (4) Date: May 7, 2008

(87) PCT Pub. No.: WO2007/006945
PCT Pub. Date: Jan. 18, 2007

(65) Prior Publication Data
US 2009/0130478 A1    May 21, 2009

(30) Foreign Application Priority Data
Jul. 7, 2005  (FR) ..................... 05 07255

(51) Int. Cl.
*B22F 3/11*    (2006.01)
*B22F 1/00*    (2006.01)
*B22F 1/02*    (2006.01)
*G10K 11/162*    (2006.01)

(52) U.S. Cl. ............. 428/570; 428/613; 75/246; 419/2; 419/23; 419/36

(58) Field of Classification Search .................. None
See application file for complete search history.

(56) References Cited

U.S. PATENT DOCUMENTS

| 3,135,044 | A | * | 6/1964 | Mote, Jr. et al. ................ 29/423 |
| 3,383,207 | A | * | 5/1968 | Butts ............................... 419/35 |
| 3,508,599 | A | | 4/1970 | Vordahl |
| 3,781,170 | A | | 12/1973 | Nakao et al. |
| 4,013,461 | A | * | 3/1977 | Elbert ............................. 419/35 |
| 4,043,381 | A | | 8/1977 | Mazdiyasni et al. |
| 4,775,598 | A | | 10/1988 | Jaeckel |
| 5,073,459 | A | | 12/1991 | Smarsly et al. |
| 6,463,759 | B1 | * | 10/2002 | Garcia et al. ...................... 63/38 |
| 6,887,519 | B1 | * | 5/2005 | Pillhoffer et al. ............. 427/237 |
| 7,544,322 | B2 | * | 6/2009 | Nadler et al. ................... 419/36 |

FOREIGN PATENT DOCUMENTS

| FR | 1 490 744 A | | 8/1967 |
| FR | 2 094 258 A | | 2/1972 |
| FR | 2 278 794 A | | 2/1976 |
| FR | 2585445 | * | 1/1987 |
| FR | 2 638 174 A1 | | 4/1990 |
| FR | 2 777 215 A1 | | 10/1999 |
| FR | 2 853 329 A1 | | 10/2004 |
| JP | 59-220350 | * | 12/1984 |
| JP | 2-256579 | * | 10/1990 |

OTHER PUBLICATIONS

Machine translation of FR 2777215. Oct. 1999.*
International Search Report, dated Feb. 6, 2007, corresponding to PCT/FR2006/001643.
Queheillalt, et al., "Ultrasonic characterization of cellular metal structures," Apr. 19, 2006, p. 1, Database Compendez (Online) Engineering Information, Inc., N.Y., N.Y., U.S., XP002376854, Database accession No. E2002096870581, abrégé, abstract only.
Queheillalt, et al., "Ultrasonic characterization of cellular metal structures," Material Science and Engineering A323 (2002) pp. 138-147, XP-002376786.

* cited by examiner

*Primary Examiner* — John J Zimmerman
(74) *Attorney, Agent, or Firm* — Christie, Parker & Hale, LLP

(57) ABSTRACT

The invention relates to a method of producing and joining superalloy balls by means of brazing and to objects produced with such joints. According to one aspect of the invention, an alloy powder covered with a brazing solder is bonded to a spherical core and subsequently transformed into a continuous alloy layer by means of brazing.

20 Claims, No Drawings

METHOD OF PRODUCING AND JOINING SUPERALLOY BALLS BY MEANS OF BRAZING AND OBJECTS PRODUCED WITH SUCH JOINTS

CROSS-REFERENCE TO RELATED APPLICATION

This application is a National Phase Patent Application of International Application Number PCT/FR2006/001643, filed on Jul. 7, 2006, which claims priority of French Patent Application Number 0507255, filed on Jul. 7, 2005.

FIELD OF THE INVENTION

The invention relates to a method for simultaneously producing a multiplicity of hollow metal bodies.

BACKGROUND OF THE INVENTION

The sound emission of an aircraft for commercial use can reach 155 dB at takeoff, a value greater than the auditory pain threshold evaluated at 130 dB. It is therefore desirable to reduce this sound emission level. One way of attempting to solve this problem consists of absorbing the noise at one of its emission points, that is to say at the engines. Solutions have already been implemented in the "cold" parts of the engines, but the "hot" parts are currently not the subject of any acoustic treatment. It is therefore desirable to develop a material having an acoustic absorption function intended for the hot parts of aircraft engines. To do this, one way envisaged is to develop a nozzle capable of partly absorbing the noise produced inside the engine.

Furthermore, in order to fulfill a property and people protection function, the manufacture of systems capable of absorbing a lot of kinetic energy whilst having a very light weight has an undeniable advantage.

One system can satisfy these different specifications: the use of ball-based cellular materials.

However, currently there are only nickel-based spheres and ceramic or organic spheres on the market. Assembly of these elements by sintering does not allow variation to infinity of the combinations desirable for achieving the above objectives and moreover the temperature capabilities are extremely limited as regards both mechanical strength and resistance to the oxidising and corrosive environment encountered in aircraft engines.

SUMMARY OF THE INVENTION

In order to resolve these difficulties it was decided to design a new material that would have the following advantages:
  Capability of having predicted performance in a specification resulting from modelling;
  Capability of consisting of the material most suitable for the use;
  Capability of having dense walls in a single operation;
  Capability of being multifunctional.

The invention relates in particular to a method of the kind defined in the introduction, and makes provision that a start is made with a multiplicity of basic bodies each comprising a shell made of a first metallic material surrounding on all sides a central space free from metallic material, and particles based on a second metallic material different from the first covering the internal face and/or the external face of said shell, said particles of each basic body having previously received a deposit of brazing metal and being connected to one another by brazing.

Optional characteristics of the invention, additional or substitute, are stated below:
  The first metallic material consists of nickel and/or cobalt;
  The second metallic material consists of a superalloy base on nickel and/or cobalt;
  The brazing is carried out using as a brazing metal an alloy based on nickel and/or cobalt containing boron or phosphorus;
  The brazing metal is obtained by chemical deposition using a bath containing at least one nickel and/or cobalt salt and compound of boron or phosphorus;
  The brazing metal is in the form of a coating of said particles;
  The particles are made use of by gluing by means of an adhesive that is eliminated by pyrolysis during brazing;
  Said central space of the basic bodies is empty, said particles covering the external face of the shell;
  The basic bodies are placed in mutual contact so as to obtain a unitary cellular metallic structure by brazing the particles covering all the basic bodies;
  Said central space of the basic bodies is occupied by a core made of organic material, the basic bodies being obtained by applying said particles on the core and covering the whole with a chemical deposit of the first metallic material and the core being eliminated by pyrolysis during the brazing;
  The first metallic material is eliminated by selective chemical attack after brazing;
  The first metallic material is converted by an aluminising treatment after brazing;
  Said shells are substantially spherical in shape.

Another object of the invention is a set of hollow metallic bodies such as can be obtained by the method defined above, wherein each hollow body comprises a layer of superalloy based on nickel and/or cobalt surrounding on all sides an empty central space.

DETAILED DESCRIPTION OF THE INVENTION

According to one aspect of the invention, a start is made with a multiplicity of balls or spheres and superalloy powder is deposited on the surface of each of them; to do this, the powder of the alloy desired for the shell is glued on the surface of the spheres serving as a former. In order to ensure good holding of the powders during the operations for brazing the powder grains to one another, a rigid shell is necessary. It can be deposited, if it is not present originally, either on top of the superalloy powders or underneath.

To form the material, the balls will be assembled by brazing. To do this, the elementary balls (made of pure nickel, composite nickel, nickel coated by mechanosynthesis and nickel coated with a glued superalloy) are chemically treated to receive a deposit of brazing metal (nickel-boron alloy deposited by the method described in FR 2 531 103) which will be followed by a heat treatment for the brazing proper.

For the purposes of improving the oxidation and hot corrosion properties of the objects thus obtained, the material can be subjected to an aluminising treatment, modified or not, such as described for example in FR 1 490 744 A, FR 2 094 258 A, FR 2 276 794 A, FR 2 638 174 A and FR 2 853 329 A. This is because the composition of a superalloy is chosen to provide the thermomechanical load during the high temperature application; but its resistance to the thermochemical conditions of the gas stream must be provided by a protective coating.

The invention is illustrated hereinafter by non-limiting examples.

Example I

Electrolytic depositions do not allow the chemical composition of a superalloy to be obtained. To overcome this difficulty, superalloy powder can be sintered directly to obtain the desired alloy. If this powder is moulded, the desired shape can, after the appropriate heat treatments, be obtained. But this operation does not allow hollow spheres to be obtained since the shell of the sphere collapses well before a start of sintering can take place. Therefore, the initial idea is to glue superalloy powders directly to the surface of formers in the shape of balls and apply a heat treatment intended to sinter the superalloy powder grains to one another. This operation can take place only at very high temperature.

In order to get round this new difficulty, the inventors decided to use a brazing technique. This treatment, inspired by that described in the patent of the applicant No. 2 777 215, consists of depositing a thin layer of nickel-boron based brazing metal on the surface of each superalloy powder grain, here the alloy marketed under the name 1N738 whereof the composition is as follows in terms of % mass:

Ni: base material; Co: 8.5; Cr: 16.0; Ti: 3.4; Al: 3.4; W: 2.6; Mo: 1.75; Ta: 1.75; C: 0.17.

Thus a simple heat treatment makes it possible to braze the powder grains together and reconstitute the superalloy. When the superalloy powder is pretreated with a chemical deposit of Ni—B, the powder layer becomes a dense, homogeneous alloy after annealing since the powder grains are brazed to one another. In the case of this invention, the deposited Ni—B brazing metal layer is approximately 0.1 pm. This layer is easy to obtain in the following manner: the surface area of the batch of powder to be treated is calculated. The weight of a 0.1 pm layer of nickel-boron (density 8.25 g/cm$^3$ for a boron content of approximately 4% by weight) is deduced therefrom. Knowing that the bath must contain approximately 8 g/l of nickel to function and that it is wished to work to exhaustion (that is until the nickel concentration becomes zero), it is necessary and sufficient to adjust the bath quantity to the quantity of powder to be treated. In this way a layer of brazing metal of predetermined and reproducible thickness is obtained very easily.

The powder thus treated must be applied to a spherical former with the aim of obtaining hollow spheres. The powders are glued directly to the surface of expanded polystyrene balls. To carry out the gluing the following procedure is used:

The following is mixed in a watch glass: approximately 90 cm$^3$ of 1N738 powder ($D_{50}$=40 μm) coated with 0.1 μm of nickel-boron and 10 cm$^3$ of ARALDITE 2011 brand epoxy adhesive using an applicator gun which makes it possible to measure out the different quantities of adhesive and hardener in order to obtain the optimum mixture recommended by the manufacturer;

Subsequently about a hundred polystyrene balls are added thereto;

Then using a second watch glass the balls are rolled in the powder+epoxy adhesive mixture;

As soon as the entire surface of the formers is covered, the balls thus coated are placed on a perforated tray and put to dry in an oven at 60° C.

The thickness of powder+adhesive obtained is approximately 0.1 mm.

In order to retain a minimum mechanical strength of the spheres becoming hollow upon elimination of the former, a shell that is still rigid at the melting temperature of the nickel-boron is necessary. For this, a thin deposit of nickel of approximately 40 μm is deposited on the surface of the composite layer comprising powder+nickel-boron+epoxy adhesive.

At this stage the polystyrene former can be dissolved after the nickel deposition using acetone or preferably benzene, with, however, the risk of obtaining a collapse of the ball through dissolving of the former and the adhesive. It is therefore preferable to eliminate the former by pyrolysis at the same time as the adhesive during the heat treatment.

In this case the heat treatment chosen favours a gentle elimination of the polystyrene by carbonation. For this the balls are placed in bulk in an alumina container fitted with a perforated lid intended to keep the balls in place during the pumping operations. Once a vacuum better than $10^{-3}$ Pa has been obtained, the following heat treatment is applied:

0.5° C. per minute ramp up to a temperature of 450° C.;
45-minute plateau;
5° C. per minute ramp up to a temperature of 1150° C.;
20-minute plateau;
Rapid cooling (from 1150° C. to 600° C. in approximately 15 minutes)

At the end of this treatment, balls made of 1N738 coated with nickel are obtained. The latter can be eliminated simply by washing in a 20% by volume nitric acid solution. But, in the case of protection against oxidation and hot corrosion, this nickel layer can advantageously be used to construct the NiAl beta coating by an aluminising treatment well known to persons skilled in the art. In this example, the balls thus manufactured are not assembled with one another and can undergo a surfacing treatment aimed at polishing them as is practised in the case of the manufacture of ball bearing balls, with the only difference that, in this case, the spheres obtained will be hollow. They can then be connected to one another to obtain a unitary cellular metallic structure, for example by the method described in FR 2 585 445 A.

Example II

Unlike Example I, here hollow nickel spheres supplied by the company ATECA are used as formers. These hollow spheres are free from polystyrene, an initial polystyrene core having been eliminated by heat treatment during the manufacturing process of the supplier.

After deposition of a mixture of 1N738 powder and adhesive as described in Example I, the spheres are placed on a perforated tray and put to dry in an oven at 60° C. Unlike Example I, the balls can then undergo heat treatment directly. For this, the balls are put in place on a support of appropriate shape according to the final structure to be obtained, for example a support in the shape of a dihedron in order to obtain a compact stack, and then placed in an oven under vacuum. In order to avoid destruction of the assembly, either the whole can be covered with a perforated lid (to allow elimination of the air) or the balls can be glued to one another, this time with a quick-setting adhesive (of cyanoacrylate type)

In all cases the heat treatment to be applied can be that intended for any brazing operation whatsoever since, apart from pyrolysis of the adhesives (epoxy and if applicable cyanoacrylate), there is no polystyrene to be eliminated. Once a vacuum better than $10^{-3}$ Pa has been obtained, the following heat treatment is applied:

5° C. per minute ramp up to a temperature of 450° C.;
45-minute plateau;

5° C. per minute ramp up to a temperature of 1150° C.;
20-minute plateau;

Rapid cooling (from 1150° C. to 600° C. in approximately 15 minutes).

In this case the final object is obtained in a single operation: the powder grains are brazed to one another and the hollow spheres are brazed to one another. On the other hand, in this case, it is not possible to burnish the external part of the shell in order to obtain a perfect sphere.

As in the previous example, after the assembly operations, it is possible to perform an aluminising well known to persons skilled in the art for the purposes of protecting the objects obtained against oxidation and hot corrosion.

Example III

The same procedure as in Example II is followed, replacing the 1N738 powder by Astroloy whereof the composition is as follows in terms of % mass:

Ni: base material; Co: 17.0; Cr: 15.0; Ti: 3.5; Al: 4.0; Mo:5.0; C: 0.04; B: 0.025.

A similar result is obtained, namely an object made of aluminised Astroloy superalloy.

The invention is not limited to nickel and nickel-based superalloys as the first and second metallic materials, but is applicable to all pairs formed by a first metallic material capable of directly forming a continuous shell, in particular by chemical deposition, and a second metallic material not having this ability but capable of undergoing brazing in the powder state. There can be cited as the second metallic material, without this list being exhaustive, powders of ferrous alloys (standard and heat-resisting steels), or of alloys based on nickel, cobalt, chromium, copper, silver 5° C. per minute ramp up to a temperature of 1150° C.;
20-minute plateau;

Rapid cooling (from 1150° C. to 600° C. in approximately 15 minutes).

In this case the final object is obtained in a single operation: the powder grains are brazed to one another and the hollow spheres are brazed to one another. On the other hand, in this case, it is not possible to burnish the external part of the shell in order to obtain a perfect sphere.

As in the previous example, after the assembly operations, it is possible to perform an aluminising well known to persons skilled in the art for the purposes of protecting the objects obtained against oxidation and hot corrosion.

Example III

The same procedure as in Example II is followed, replacing the 1N738 powder by Astroloy whereof the composition is as follows in terms of % mass:

Ni: base material; Co: 17.0; Cr: 15.0; Ti: 3.5; Al: 4.0; Mo:5.0; C: 0.04; B: 0.025.

A similar result is obtained, namely an object made of aluminised Astroloy superalloy.

The invention is not limited to nickel and nickel-based superalloys as the first and second metallic materials, but is applicable to all pairs formed by a first metallic material capable of directly forming a continuous shell, in particular by chemical deposition, and a second metallic material not having this ability but capable of undergoing brazing in the powder state. There can be cited as the second metallic material, without this list being exhaustive, powders of ferrous alloys (standard and heat-resisting steels), or of alloys based on nickel, cobalt, chromium, copper, silver or gold. This technique is also applicable to object shapes other than spheres: hollow cubes or small- or large-sized tubes. This technique also makes it possible to produce a material on request: the object is designed, the former is produced and the end material is produced (the so-called "material by design" approach). Therefore, it is possible to apply this technique to hollow objects that are no longer spherical but of any shape whatsoever, depending on the former.

The invention claimed is:

1. A method for simultaneously producing a multiplicity of hollow metal bodies from at least two different metallic materials, the method comprising:
   providing a multiplicity of basic bodies, each comprising a shell made of a first metallic material surrounding on all sides a central space free from metallic material;
   depositing a brazing metal on a plurality of particles, each particle based on a second metallic material different from the first;
   covering the internal face and/or the external face of the shell of each of the multiplicity of basic bodies with the plurality of particles; and
   subjecting the resulting multiplicity of particle-covered bodies to a heat treatment to connect said particles to one another by brazing.

2. The method according to claim 1, wherein the first metallic material consists of nickel and/or cobalt.

3. The method according to claim 1, wherein the second metallic material consists of a superalloy based on nickel and/or cobalt.

4. The method according to claim 3, wherein the brazing metal comprises an alloy based on nickel and/or cobalt containing boron or phosphorus.

5. The method according to claim 4, wherein the brazing metal is obtained by chemical deposition using a bath containing at least one nickel and/or cobalt salt and a compound of boron or phosphorus.

6. The method according to claim 1, wherein the brazing metal is in the form of a coating of said particles.

7. The method according to claim 1, wherein the particles are glued to the multiplicity of basic bodies using an adhesive that is eliminated by pyrolysis during brazing.

8. The method according to claim 1, wherein said central space of the basic bodies is empty, said particles covering the external face of the shell.

9. The method according to claim 8, wherein the basic bodies are placed in mutual contact so as to obtain a unitary cellular metallic structure by brazing the particles covering all the basic bodies.

10. The method according to claim 1, wherein said central space of the basic bodies is occupied by a core made of organic material, the basic bodies being obtained by applying said particles on the core and covering the whole with a chemical deposit of the first metallic material and the core being eliminated by pyrolysis during the brazing.

11. The method according to claim 10, wherein the first metallic material is eliminated by selective chemical attack after brazing.

12. The method according to claim 10, wherein the first metallic material is converted by an aluminizing treatment after brazing.

13. The method according to claim 1, wherein said shells are substantially spherical in shape.

14. A set of hollow metallic bodies obtained by the method according to claim 1, wherein each hollow body comprises a layer of superalloy based on nickel and/or cobalt surrounding on all sides an empty central space.

15. A method for simultaneously producing a multiplicity of hollow bodies formed of a first metallic material and a second metallic material, the method comprising:
- providing a plurality of hollow formers of desired shape, each former being formed of a first metallic material;
- rolling the plurality of hollow formers in a mixture containing particles of a second metallic material, a brazing metal, and an adhesive to make a plurality of coated, hollow formers; and
- subjecting the plurality of coated, hollow formers to a heat treatment that pyrolyzes the adhesive and causes the particles of the second metallic material to be connected to one another by brazing to produce the multiplicity of hollow metal bodies.

16. The method according to claim 15, wherein the heat treatment also causes the multiplicity of hollow metal bodies to be connected to one another by brazing.

17. The method according to claim 15, wherein the first metallic material is nickel, the second metallic material is a nickel-based superalloy, and the brazing metal is a nickel-boron based material.

18. A method for simultaneously producing a multiplicity of hollow bodies formed of a first metallic material and a second metallic material, the method comprising:
- providing a plurality of hollow formers of desired shape, each former being formed of a pyrolyzable, non-metallic material;
- rolling the plurality of hollow formers in a mixture containing particles of a first metallic material, a brazing metal, and an adhesive to make a plurality of coated, hollow formers;
- coating a layer of a second metallic material on each of the coated, hollow formers; and
- subjecting the plurality of coated, hollow formers to a heat treatment that pyrolyzes the adhesive and the non-metallic material of the former and causes the particles of the second metallic material to be connected to one another by brazing to thereby produce the multiplicity of hollow metal bodies.

19. The method according to claim 18, wherein the heat treatment also causes the multiplicity of hollow bodies to be connected to one another by brazing.

20. The method according to claim 18, wherein the non-metallic material is polystyrene, the first metallic material is a nickel-based superalloy, the second metallic material is nickel, and the brazing compound is a nickel-boron based material.

* * * * *